United States Patent [19]

Stiehler

[11] Patent Number: 5,345,286
[45] Date of Patent: Sep. 6, 1994

[54] METHOD AND APPARATUS FOR CONTROLLING FILM DRIVE

[75] Inventor: Wayne Stiehler, Spencerport, N.Y.

[73] Assignee: Eastman Kodak Company, Rochester, N.Y.

[21] Appl. No.: 62,525

[22] Filed: May 11, 1993

[51] Int. Cl.⁵ .............................................. G03B 1/18
[52] U.S. Cl. ............................ 354/173.1; 354/173.11; 352/160; 352/182
[58] Field of Search ...................... 354/173.1, 173.11; 352/160, 163, 180, 182

[56] References Cited

U.S. PATENT DOCUMENTS

| | | | |
|---|---|---|---|
| 1,984,143 | 12/1934 | Kraft | 88/18.4 |
| 3,622,235 | 11/1971 | Yamada | 352/92 |
| 4,494,842 | 1/1985 | Kimura et al. | 354/173.11 |
| 4,632,530 | 12/1986 | Iwata et al. | 354/173.11 |
| 4,697,896 | 10/1987 | Fox | 352/180 |
| 4,734,732 | 3/1988 | Nishio et al. | 354/173.11 |
| 4,878,077 | 10/1989 | Maeno et al. | 354/400 |
| 4,987,431 | 1/1991 | Harvey | 354/21 |
| 5,008,692 | 4/1991 | Diehl et al. | 354/173.1 |
| 5,049,908 | 9/1991 | Murakami | 354/173.1 |
| 5,110,201 | 5/1992 | Haas | 352/180 |

FOREIGN PATENT DOCUMENTS 57-19722   2/1982  Japan .
57-85044   5/1982  Japan .
57-185028  11/1982 Japan .
63-4200    2/1988  Japan .
3-53217    11/1991 Japan .

*Primary Examiner*—Monroe H. Hayes
*Attorney, Agent, or Firm*—Peter J. Bilinski

[57] ABSTRACT

A film drive control system includes a light source that directs a beam at a photographic filmstrip and a sensor located such that it detects this light source depending on whether or not the light source is blocked by the passage of the photographic filmstrip. The filmstrip includes perforations that indicate frame exposure areas. The filmstrip is advanced one frame at a time by first moving the film forward at a relatively high velocity until the leading edge of the perforation passes the sensor, then reducing the velocity in the forward direction until the trailing edge of the perforation passes the sensor. The filmstrip is then moved in the film reverse direction at a reduced velocity until the trailing edge again passes by the sensor, at which time the filmstrip is halted.

11 Claims, 4 Drawing Sheets

METHOD AND APPARATUS FOR CONTROLLING FILM DRIVE

BACKGROUND OF THE INVENTION

1. Field of the Invention

The present invention relates generally to photographic equipment with motor-driven film advancement and, more particularly, to motor control systems for film advancement.

2. Description of the Related Art

Many photographic cameras include a film drive feature that provides automatic advancement of a filmstrip in the camera after an exposure is produced. Automatic advancement places a fresh, unexposed portion of the filmstrip at an exposure gate of the camera, leaving the camera ready to produce the next exposure. In this way, the camera user is freed from manually advancing the film to produce a series of exposure frames. The film drive feature typically is provided by a drive system having an electric motor that is coupled to the filmstrip by a gear train and a control system that controls the motor to move the filmstrip in a film advance direction by a distance approximately equal to a frame spacing interval.

If a filmstrip is to be commercially processed, the exposure frames on the film should be spaced apart at uniform intervals that are compatible with commercial processing equipment. This is important because most commercial processing is automated and high-speed processing machines are frequently used. Such machines carry out developing and printing, for example, assuming that film to be processed has a standard frame spacing format. If the frame spacing does not conform to the conventional standard, then frames can be processed incorrectly and ruined. For example, prints can be cut off or superimposed on each other.

Cameras with an automatic film drive feature must quickly advance the filmstrip after each exposure by a distance equal to the uniform spacing interval. Any system that provides automatic film drive after an exposure must be able to quickly move the filmstrip to bring a fresh frame at the proper location and then completely stop the film. For example, many cameras are capable of producing exposure frames at a rate of four or five frames per second.

Some of the problems that are encountered by automatic film drive systems are backlash in the gear trains of the motor drive systems and variations in motor load and power source conditions. Backlash refers to the free play in a gear train, which can permit the film to migrate from the position it occupied when the motor was initially stopped, resulting in non-uniform spacing between frames. Variations in load and power occur because of variations in battery strength and intermittent loads from systems such as flash units. Such variations can cause inconsistent motor speed, which can result in inconsistent positioning of the filmstrip.

Another problem faced by automatic film advance systems is film overshoot, which typically occurs when exposures are taken in rapid succession and the film is advanced at relatively high velocities. Overshoot refers to the film coming to rest at a position beyond the intended frame location, causing the frame spacing interval to be other than specified. As film velocities increase, such as might occur when the shutter button is quickly and repeatedly pressed, the inertia of the motor and gear train in a camera can permit the film to travel a distance beyond the intended stop position. This additional travel can alter the frame spacing interval and create the problems noted above, such as incorrect processing and cut-off images.

Various systems have been developed to reduce overshoot and backlash problems, accurately position film, and advance film in accordance with conventional spacing standards. Some systems reverse the direction of the film drive motor after the film has been advanced by one frame. Other systems attempt to lock the film in place. For example, U.S. Pat. No. 5,008,692 to Harvey describes a film advance system having a mechanical pawl that drops into a film perforation. The system reduces the film velocity prior to the film reaching the intended stop position.

Mechanical systems that use cams and pawls for indexing are susceptible to wear, and therefore the accuracy of film placement in such systems can change as the system ages and is used. Therefore, electromagnetic and optical-based systems have been used for film positioning. For example, U.S. Pat. No. 4,987,431 to Harvey describes a film advance system that reads magnetically encoded frame indicia from a photographic film and moves the film either forward one frame or back one frame if film slippage occurs between exposures. In other film drive control systems, optical systems detect the passing of film perforations to provide an approximate location of a film exposure frame. An electromagnetic system, however, requires film movement to read the frame indicia and therefore can be susceptible to overshoot errors. Many optical systems simply attempt to halt film advancement when a particular perforation is first detected. Thus, optical systems of this type assume a standard amount of coasting between the detection of the perforation and the stopping of the film. The amount of coasting, however, depends on the film velocity. Therefore, such a scheme also can be susceptible to overshoot errors. Thus, some of the electromagnetic and optical systems do not provide a relatively high degree of film positioning accuracy and can be susceptible to overshoot.

From the discussion above, it should be apparent that there is a need for a film drive control system that is reliable and accurate, is capable of accommodating high film velocities, and is not subject to problems such as backlash and overshoot, and provides uniform, standard frame interval spacing. The present invention satisfies this need.

SUMMARY OF THE INVENTION

In accordance with the invention, a method of controlling movement of a filmstrip includes moving the filmstrip at relatively high velocity in a forward film direction until the leading edge of an exposure frame indicia passes a predetermined location, moving the filmstrip at a reduced velocity in the forward film direction until a trailing edge of the perforation passes by the predetermined location, moving the filmstrip at a reduced velocity in a reverse film direction until the trailing edge of the perforation again passes the predetermined location, and halting the filmstrip in response to the trailing edge passing the predetermined location.

A film drive control system constructed in accordance with the invention includes an emitter that directs a beam toward the filmstrip perforations as the system moves the filmstrip in a film advance direction. When the beam first passes through a film perforation, the system reduces the film velocity but continues advancing the film. When the filmstrip has moved sufficiently that the beam no longer passes through the film perforation, the system begins moving the film in a film reverse direction at a reduced velocity. When the filmstrip has moved sufficiently such that the beam again passes through the film perforation, the filmstrip is precisely positioned and the system halts movement of the film. In this way, a film drive control system in accordance with the invention quickly and accurately moves a filmstrip forward by one frame, with a minimum of overshoot and without using cams, pawls, and the like that are susceptible to wear and deterioration.

In one aspect of the invention, a film drive control system operates with a filmstrip having a plurality of exposure frame-defining perforations and includes a light source that directs a beam of light at the film perforations, an optical sensor positioned relative to the filmstrip such that it receives the light beam when the beam passes through one of the filmstrip perforations and otherwise is blocked by the film from receiving the light, and a controller that controls the movement of the film after an exposure is produced. For filmstrip movement in a predetermined film advance direction, the controller controls the filmstrip movement such that movement takes place in a film advance direction at a first, relatively high speed until the light passes by the leading edge of a film perforation that defines a next exposure frame. The controller responds to the light beam passing through the perforation by moving the film in the film advance direction at a reduced speed until the trailing edge of the perforation passes the sensor and the beam is blocked by the filmstrip. After the beam is blocked by the filmstrip, the controller moves the film in a film reverse direction at a reduced speed until the trailing edge passes the sensor and the beam again passes through the film perforation, when the controller stops the film movement.

Other features and advantages of the present invention should be apparent from the following description of the preferred embodiments, which illustrate, by way of example, the principles of the invention.

DESCRIPTION OF THE PREFERRED EMBODIMENTS

Figure 1:
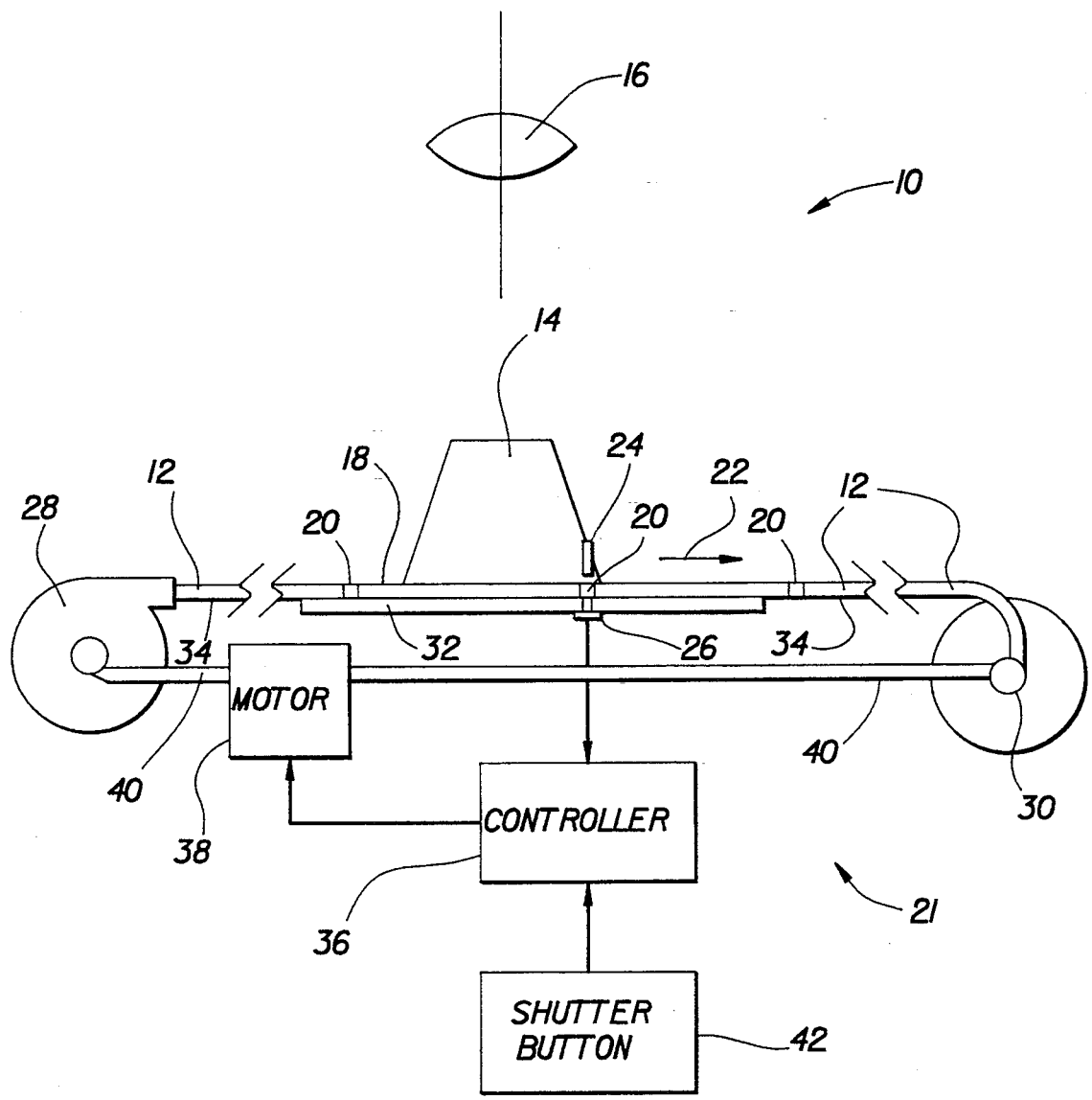
FIG. 1 is a schematic plan view of a camera constructed in accordance with the present invention.

FIG. 1 shows a camera 10 with a photographic filmstrip 12 extending across an exposure gate 14 so that ambient light from a photographic scene can be directed through the taking lens 16 of the camera and onto a top surface 18 of the filmstrip, thereby producing an exposure frame. The filmstrip includes frame indicia in the form of a plurality of perforations 20. That is, a film perforation defines the end of one frame and the beginning of another, and thereby defines an exposure frame area. The camera 10 includes a film drive control system 21 that automatically moves the film by one frame in the film advance direction, moving it from left to right in FIG. 1, as indicated by the arrow 22. The control system advances the filmstrip by moving the filmstrip at a relatively high velocity until the leading edge of a frame indicia passes a predetermined location, at which time the control system reduces the velocity of the filmstrip to decrease overshoot but continues to move it forward. When a trailing edge of the frame indicia passes by the predetermined location, the direction of the filmstrip is reversed. When the trailing edge of the perforation again reaches the predetermined location, the filmstrip is determined to be at its intended location and is halted. In this way, the filmstrip is quickly moved forward by one frame, with a minimum of overshoot and without using cams, pawls, and the like that are susceptible to wear and deterioration.

More particularly, the film drive control system 21 in accordance with the invention is an optical-based system that does not rely on physical contact such as cams to determine the position of frame indicia. In the preferred embodiment, the system controls film movement by directing a beam of light from an emitter 24 toward the filmstrip 12 and moving the filmstrip in the film advance direction toward the next exposure frame area. When the emitter beam passes through the next frame indicia, or film perforation 20, the beam is received by an optical sensor 26. In response, the control system reduces the film velocity so as to decrease overshoot. When the filmstrip has moved so the emitter beam no longer passes through the film perforation, the control system 21 reverses the direction of film travel to move in a film reverse direction, from right to left in FIG. 1. When the filmstrip has moved so the beam again passes through the film perforation 20, the filmstrip is halted.

The optical components themselves are not subject to mechanical free play or delays caused by mechanical movement, such as might be caused by a pawl dropping into a perforation to control film stopping. The optical components also are not subject to physical wear from friction with the filmstrip. Moreover, the optical-based system 21 is very accurate in detecting the position of the perforation relative to a predetermined location and therefore provides consistent and reliable operation.

In the preferred embodiment illustrated in FIG. 1, the filmstrip 12 is pulled out from a film cartridge 28 and is wound up on a take-up spool 30. The filmstrip is pulled taut across the exposure gate 14 of the camera 10 and is held flat, substantially against the exposure gate, by a film platen 32, frame rails, or the like. The emitter 24 comprises, for example, an infrared light source that produces a beam having a wavelength in the non-visible range. Thus, the emitter does not expose the filmstrip 12. The emitter is located on one side of the filmstrip, near the top surface 18 of the filmstrip. The optical sensor 26 is placed on the opposite side of the filmstrip from the emitter, adjacent the back surface 34 of the filmstrip, and produces an electrical signal when it receives light from a source. The sensor signal is provided to a system controller 36. When a perforation 20 is located directly above the sensor 26, the beam produced by the emitter 24 passes through the perforation and is received by the sensor, which produces its signal. The filmstrip otherwise intercepts the beam and blocks the sensor from receiving it. When the sensor no longer receives the beam, the sensor stops producing its electrical signal.

A film drive motor 38 is coupled by a gear train 40 to the film cartridge 28 and take-up spool 30 of the camera 10. The film drive motor is controlled by the controller 36 in accordance with the signal from the sensor 26. When a camera shutter button 42 is pressed, an exposure is produced on the filmstrip 12 and the controller activates the film drive motor so it rotates and moves the filmstrip at a relatively high velocity in the film advance direction onto the take-up spool, in the direction of the arrow 22. Thus, the filmstrip is moved in what is referred to as a "conventional wind" direction. Those skilled in the art will understand that the principles of the invention also could be applied to so-called prewind or expose-on-rewind cameras that, upon loading film, wind the film onto a take-up spool and then rewind the film into the cartridge as exposures are produced. When the shutter button 42 of the illustrated camera 10 is pressed and the motor 38 is continuously rotated, the controller 36 simultaneously activates the emitter 24 so the emitter beam is directed at the filmstrip and at the sensor 26.

Figure 2:
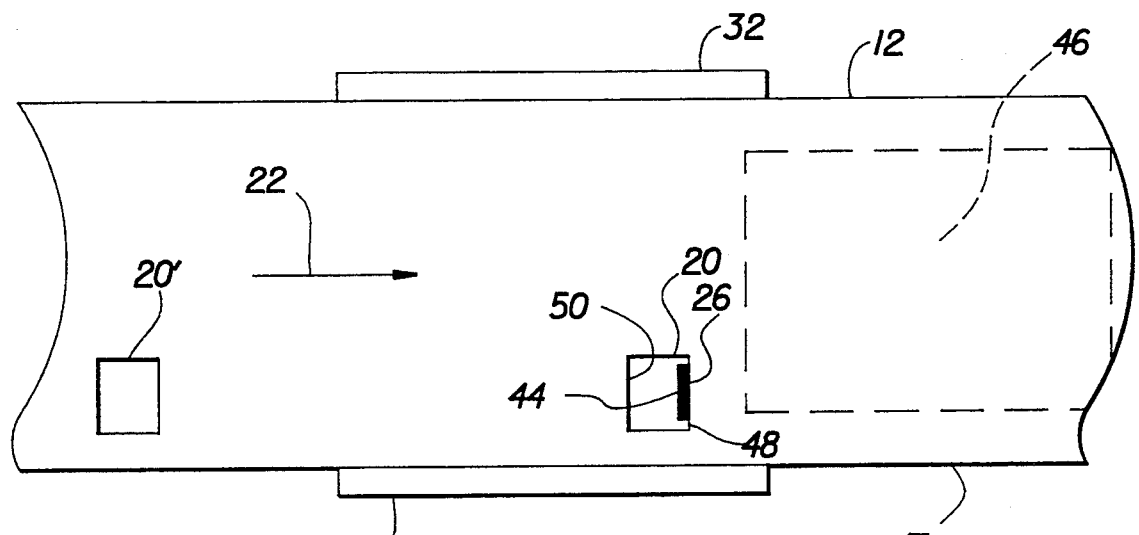
FIGS. 2, 3, and 4 are schematic elevational views that show successive movements of a filmstrip in the camera illustrated in FIG. 1.
Figure 3:
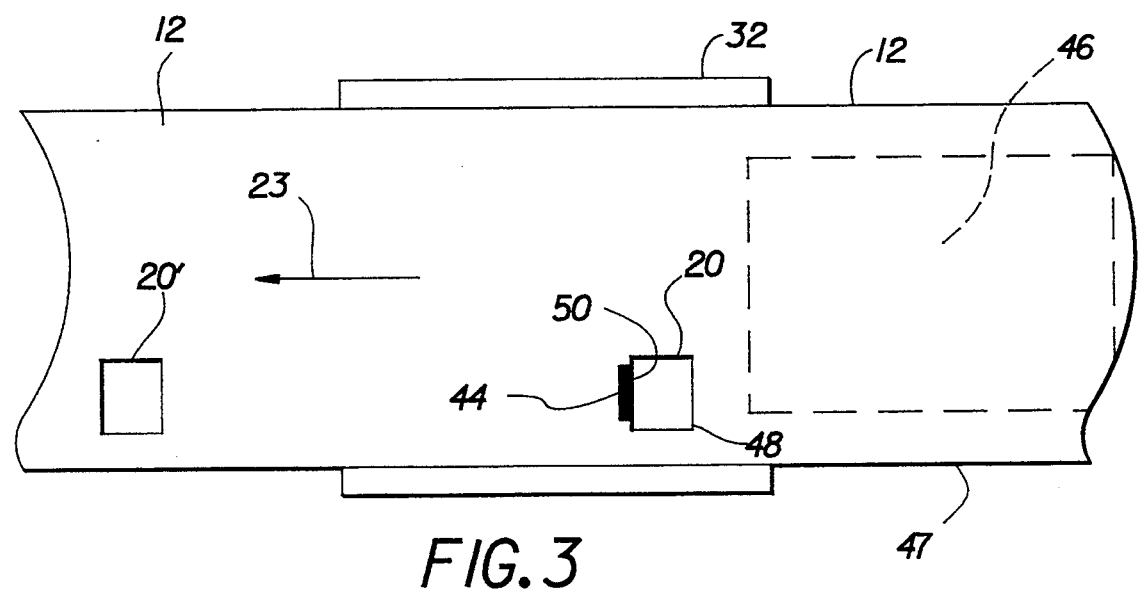
Figure 4:
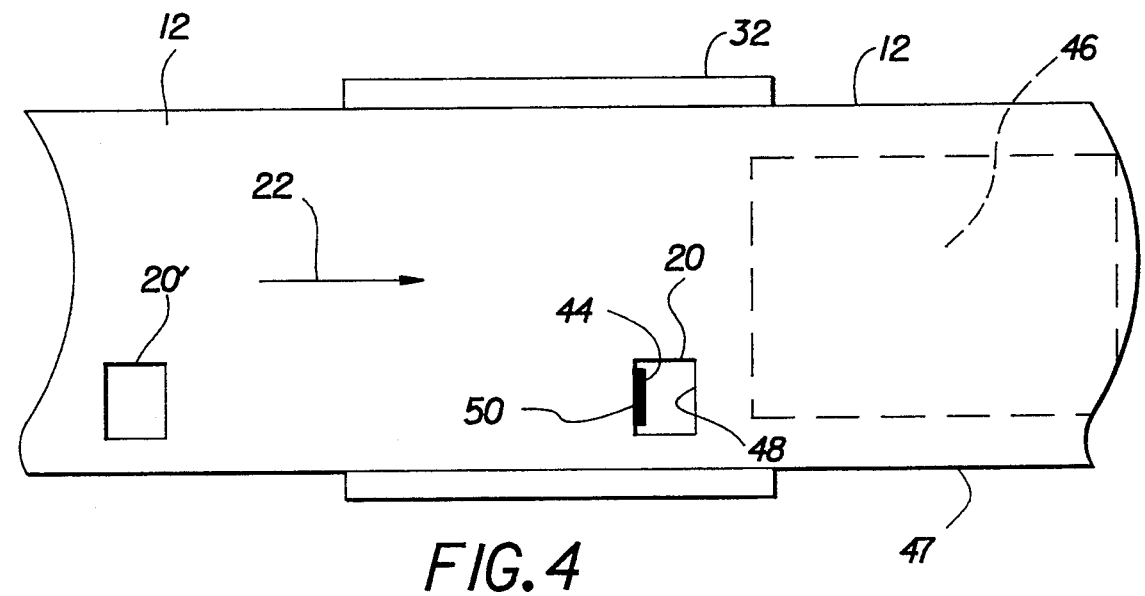

The operation of the film drive control system 21 can be better understood with reference to FIGS. 2, 3, and 4, which are schematic elevational views of the camera 10 and which illustrate the movement of the filmstrip 12 and a perforation 20 relative to the film platen 32 and the optical sensor 26. In FIGS. 2, 3, and 4, the sensor is visible only through a sensor aperture 44 in the film platen 32. The sensor aperture restricts the size of the emitter beam received by the sensor, thereby increasing the accuracy of the control system. It is to be understood that the perforation and sensor/aperture are shown enlarged relative to the filmstrip for purposes of illustration.

FIGS. 2-4 show that an exposure 46 has been produced on the filmstrip 12, which has been moved from the exposure gate in the film advance direction indicated by the arrow 22 so an unexposed portion of the filmstrip is in position for the next exposure. A next film perforation 20' also is illustrated in FIG. 2. The perforations 20, 20' are located along a lower edge 47 of the filmstrip. FIG. 2 shows that the filmstrip 12 has moved sufficiently so a film perforation 20 is located over the sensor aperture 44 and, more particularly, the filmstrip has moved sufficiently forward that a leading edge 48 of the perforation has passed by the sensor aperture. Therefore, the perforation permits the sensor to be visible through the aperture. Thus, the emitter beam can pass through the perforation and be received by the sensor 26.

As noted above, when the sensor 26 receives the emitter beam, it produces a signal that is provided to the controller 36. When the controller 36 (FIG. 1) receives the sensor signal, the controller changes the operation of the motor 38 so the motor is operated at a reduced duty cycle at a relatively high frequency. The motor can be operated, for example, at a 50% duty cycle comprising one to twenty milliseconds on and an equal time interval off. During the "off" duty cycle intervals, the motor is coasting. The coasting slows the filmstrip movement, reducing the film velocity and also reducing overshoot while continuing to move the filmstrip forward.

Using a reduced duty cycle is one way of slowing the motor 38. Alternatively, the motor can be "plugged" or braked. Plugging the motor comprises reversing the polarity of the current supplied to the motor sufficiently to reduce the speed but not reverse the motor direction. Braking the motor comprises connecting the motor terminals so the motor operates as a generator, creating resistance to rotation. In either case, the motor is slowed by a greater proportion as compared with permitting the motor to coast during the "off" periods of the reduced duty cycle, which is the case described above.

As the motor 38 is slowed and the filmstrip 12 is moved forward at a reduced velocity, the perforation 20 eventually will move beyond the sensor aperture 44 and the filmstrip will again block the sensor 26 from receiving the emitter beam. This occurs because, as illustrated in FIG. 3, a trailing edge 50 of the perforation eventually passes by the sensor so that the filmstrip again blocks the sensor from receiving the emitter beam. When the sensor no longer receives the emitter beam and no longer produces the sensor signal, the controller 36 will reverse the direction of film movement so the filmstrip 12 is moved from right to left in FIG. 3, in the film rewind direction indicated by the arrow 23, and will continue to operate the motor at a reduced duty cycle. In the preferred embodiment, the controller reverses the direction of rotation of the motor, but the change in film direction also can be accomplished through reversing the rotation of the gear train 40 (FIG. 1). Such reversing can be accomplished, for example, with a solenoid-activated reverse gear. The details of such an implementation will be known to those skilled in the art and therefore will not be described in detail.

When the motor 38 is reversed, it is operated in a reduced duty cycle. The motor can be operated, for example, at a 50% duty cycle at a cycle time of between one and twenty seconds. After the motor is reversed and the filmstrip 12 is moved in the rewind direction, the perforation 20 eventually will move back over the sensor aperture 44. When the perforation again uncovers the sensor 26, the sensor can once again receive the emitter beam and produce its signal. When the controller 36 receives the sensor signal, the controller will shut off the motor. In the reduced duty cycle, reverse operation of the motor 38, the film velocity is sufficiently small so that excessive coasting is reduced and any overshoot error upon halting the motor is minimized. Therefore, after each exposure, when the controller 36 shuts off the motor, the filmstrip 12 is accurately and consistently stopped with the sensor 26 and perforation 20 in substantially the same relative positions each time, ready for the next exposure, without overshoot.

Figure 5:
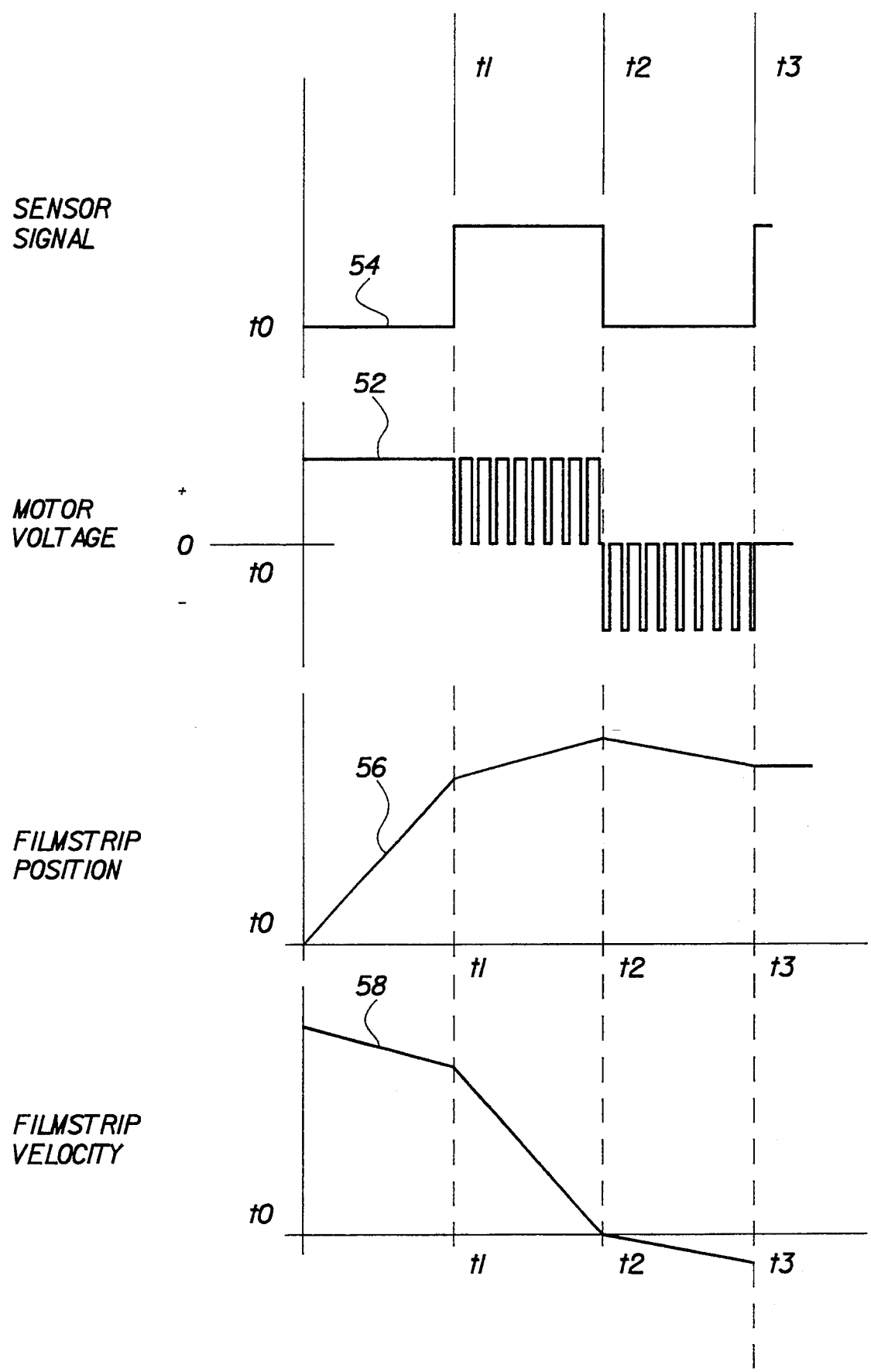
FIG. 5 is a graph of sensor voltage, film drive motor voltage, relative position of the filmstrip, and filmstrip velocity for the camera illustrated in FIG. 1.

Details of the film drive motor 38 and optical sensor 26 operation during the film advancement sequence are further illustrated by the graph of motor voltage 52, and sensor output signal 54, relative filmstrip position 56, and filmstrip velocity 58 illustrated in FIG. 5. Initially, at time t0, the controller 36 maintains the motor voltage at its high operating condition as the motor is driven continuously, that is, at a 100% duty cycle, and the filmstrip 12 is moved forward at a relatively high speed. Because the filmstrip is blocking the sensor 26 from receiving the emitter beam, the sensor signal also is at a low condition. Filmstrip position relative to the sensor is increasing linearly as the filmstrip velocity is constant.

At a time t1, the filmstrip 12 has moved sufficiently so the leading edge 48 of the perforation 20 has passed the sensor aperture 44 and the perforation has uncovered the sensor 26, as illustrated in FIG. 2. Therefore, at time t1 the optical sensor signal 54 changes to a high condition. As indicated by the motor voltage waveform 52, after time t1, the motor is operated in a reduced duty cycle mode by the controller 36, still in the forward direction. This reduces the speed of the motor, which reduces the film velocity 58 and reduces the rate of change of the filmstrip position 56.

The sensor signal waveform 54 changes from the high condition back to the low condition at time t2, indicating that the sensor 26 is again blocked by the filmstrip 12. This condition corresponds to that illustrated in FIG. 3. When the sensor signal changes back to the low condition, the controller 36 responds by reversing the motor 38, as illustrated by the motor voltage waveform 52 after time t2. Accordingly, filmstrip position moves in the reverse direction and film velocity is negative. The FIG. 5 graph of the motor voltage 52 shows that, in the preferred embodiment, the duty cycle of the motor during reverse operation is reduced as compared with the duty cycle during the reduced forward speed condition between time t1 and time t2. That is, the time period of the "on" and "off" duty cycles is reduced during the reverse operation as compared with the "on" and "off" time periods during the reduced forward velocity operation. The reduced reverse duty cycle has the effect of reducing the magnitude of the motor velocity as compared with the reduced forward velocity operation described above.

At time t3, the sensor signal waveform 54 changes back to the high condition, indicating that the filmstrip has moved sufficiently to move the trailing edge 50 of the perforation 20 so the sensor 26 can once again receive the emitter beam. In response, the controller 36 shuts off the motor 38, as indicated by the motor voltage waveform 52 returning to the zero level. As a result, filmstrip position 56 and filmstrip velocity 58 are unchanged after time t3. Thus, the filmstrip 12 is positioned with proper registration relative to the exposure gate 14 for an exposure without any physical contact and accompanying wear on either the emitter 24 and sensor 26, comprising indexing components of the film drive control system, or on the filmstrip itself. When the motor is to be operated so as to again move the filmstrip 12 at a relatively high velocity, the controller will raise the motor voltage to the "+" condition so the waveform again appears as it does in FIG. 5 before the time t1.

Figure 6:
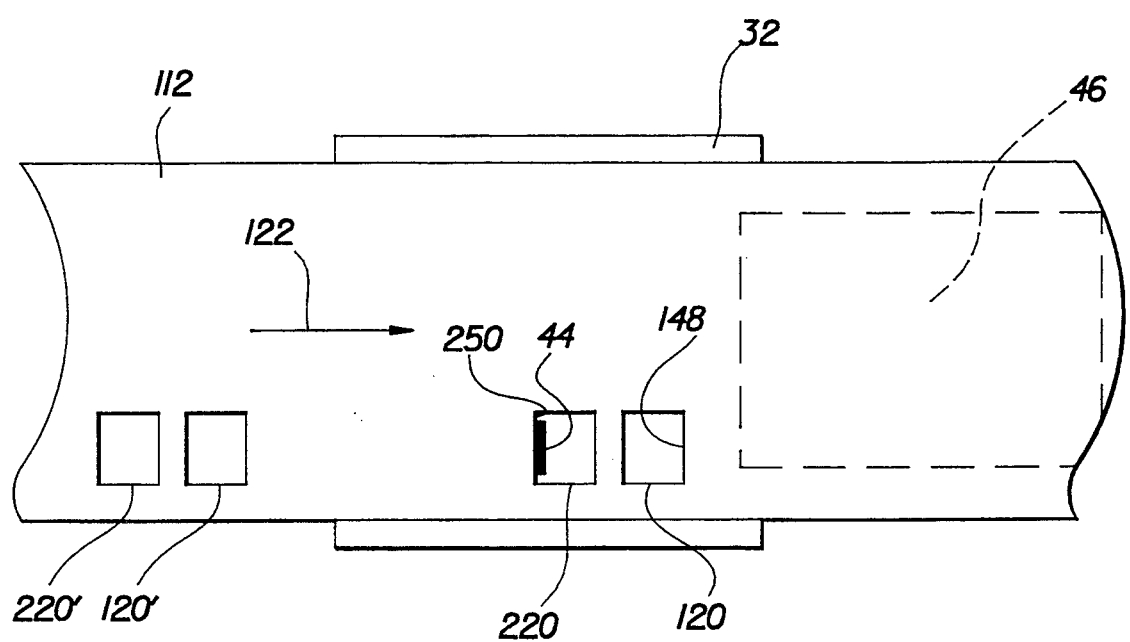
FIG. 6 is a schematic elevational view of a filmstrip having two perforations per exposure frame in a camera constructed in accordance with the present invention.

The filmstrip 12 illustrated in FIG. 1 is provided with one perforation per exposure frame area, but it is to be understood that a camera in accordance with the invention can be used with a filmstrip having a variety of exposure frame indicia. The frame indicia can comprise, for example, any number of film perforations, optically detectable marks, notches, or the like. FIG. 6 shows a filmstrip 112, for example, that contains two film perforations 120, 220 per exposure frame. In the case of the forward direction of film travel indicated by the arrow 122, each exposure frame area is defined by a first perforation 120 and a second perforation 220. In accordance with the present invention, the operating principles described above for the single perforation embodiment can be applied to the filmstrip illustrated in FIG. 6. Thus, the optical sensor detects when a leading edge of an exposure frame indicia passes by the sensor and the controller reduces the velocity of the filmstrip until a trailing edge of a frame indicia passes by. When the trailing edge is detected, the controller reverses the filmstrip direction at a reduced velocity until the trailing edge again is detected, at which time the controller halts the filmstrip. In the embodiment described above, the leading and trailing edges are the edges of an exposure frame indicia comprising a single film perforation. In the two-perforations-per-frame embodiment of FIG. 6, the first exposure frame indicia comprises the first perforation 120 and the second exposure frame indicia comprises the second perforation 220.

In the FIG. 6 embodiment, the optical sensor 26 senses when the leading edge 148 of the first perforation 120 passes by and reduces the filmstrip velocity until the trailing edge 250 of the second perforation 220 is detected. When the trailing edge of the second perforation is detected, the direction of filmstrip movement is reversed, again at a reduced velocity, until the trailing edge again is detected. When the trailing edge of the second perforation is detected, the controller 36 halts the motor and stops movement of the filmstrip. The same system logic would be used for a filmstrip having a greater number of film perforations per exposure frame area. For example, conventional 35 mm photographic film has eight perforations per frame. With 35 mm film then, the film drive control system would detect the film perforations and could use the leading and trailing edges of the seventh and eighth perforations, respectively, to control film movement.

As described above, a photographic camera having a film drive control system in accordance with the invention can quickly and accurately advance a photographic filmstrip with reduced overshoot error, and can do so without relying on mechanical means of indexing that are susceptible to wear. Modifications to the preferred embodiment will occur to those skilled in the art. For example, the optical sensor can be located on the same side of the filmstrip as the emitter, so long as the sensor detects a change of signal from the emitter beam after the beam passes through a perforation. Also, the sensor signal can be high and go low when it receives the emitter beam, rather than the reverse. The principles of the invention also can be applied to prewind cameras or conventional wind cameras with a film travel direction opposite to that illustrated in the drawings. Those skilled in the art also will appreciate that a film drive control system such as described in connection with the preferred embodiment also can be adapted to applications other than cameras. For example, those skilled in the art will understand how to adapt the camera embodiment described above to film processing machines that produce finished prints from exposed rolls of photographic film. Such machines also must advance a filmstrip quickly and accurately, one frame at a time, and therefore are suited for application of the invention.

Thus, the present invention has been described above in terms of a presently preferred embodiment so that an understanding of the present invention can be conveyed. There are, however, many configurations for film drive control systems not specifically described herein, but with which the present invention is applicable. The present invention therefore should not be seen as limited to the particular embodiment described herein, but rather, it should be understood that the present invention has wide applicability with respect to film drive control systems in a variety of applications. All modifications, variations, or equivalent arrangements that are within the scope of the attached claims should therefore be considered to be within the scope of the invention.

The following reference numerals are associated with corresponding elements in the drawings:

camera 10
filmstrip 12
exposure gate 14
taking lens 16
filmstrip top surface 18
perforation 20
film drive control system 21
film advance direction arrow 22
film rewind direction arrow 23
emitter 24
optical sensor 26
film cartridge 28
take-up spool 30
film platen 32
filmstrip back surface 34
system controller 36
film drive motor 38
gear train 40
camera shutter button 42
sensor aperture 44
filmstrip exposure frame 46
perforation leading edge 48
perforation trailing edge 50
motor voltage waveform 52
sensor output signal waveform 54
relative filmstrip position 56
filmstrip velocity 58
two-perforation-per-frame filmstrip 112
first film perforation 120
forward direction arrow 122
first perforation leading edge 148
second perforation 220
second perforation trailing edge 250

I claim:

1. A method of controlling the movement of a photographic filmstrip having indicia for defining an exposure frame in a camera, each said indicia comprising a leading edge and a trailing edge, the method comprising the steps of:

moving the filmstrip at a relatively high velocity in a forward film direction until the leading edge of an exposure frame indicia passes a predetermined location;

moving the filmstrip at a reduced velocity in the forward film direction until a trailing edge of said indicia passes by the predetermined location;

moving the filmstrip at a reduced velocity in a reverse film direction until the trailing edge of said indicia again passes the predetermined location; and halting the filmstrip in response to the trailing edge of said indicia passing the predetermined location.

2. The method of controlling film movement as defined in claim 1, wherein:

the exposure frame indicia comprises at least one perforation for defining an exposure frame along at least one edge of the filmstrip wherein the step of moving the filmstrip at a relatively high velocity includes optically detecting the leading edge of a perforation by directing a beam of light at the filmstrip edge having said at least one perforation and detecting when the beam passes there through.

3. A method of controlling the movement of a photographic filmstrip having at least one perforation having a leading edge and a trailing edge along at least one edge of the filmstrip for defining exposure frame areas of the film, the method comprising the steps of:

directing a beam of light toward the filmstrip edge containing said at least one perforation and moving the filmstrip continuously in a film advance direction from a first exposure frame area toward a next exposure frame area;

detecting when the beam first passes through the leading edge of a film perforation indicating the next exposure frame area and thereafter moving the filmstrip at a reduced velocity in the film advance direction;

detecting when the beam no longer passes through the film perforation when said trailing edge of said perforation has advanced past the beam and thereafter moving the filmstrip at a reduced velocity in a film rewind direction;

detecting when the beam again passes through the film perforation upon said beam passing said drilling edge of said perforation and thereupon halting the movement of the filmstrip.

4. A method of controlling film movement as defined in claim 3, wherein the reduced velocity in the reverse film direction comprises a velocity having a magnitude different from the magnitude of the reduced velocity in the film forward direction.

5. A film drive control system for advancing a filmstrip by one exposure frame, the filmstrip having at least one perforation having a leading edge and a trailing edge along at least one edge of said filmstrip that define exposure frames of the filmstrip, the film drive control system comprising:

an emitter that produces a beam of light that is directed at said at least one filmstrip; perforation a sensor that is positioned relative to the filmstrip such that it receives the beam from the emitter when the beam passes through one of said at least one perforation and otherwise is blocked by the filmstrip from receiving the beam; and a controller that responds to the sensor to control the movement of the filmstrip after an exposure is produced such that the controller first moves the filmstrip in a film advance direction until the beam from the emitter passes through the leading edge of a film perforation defining a next exposure frame, the controller then moves the filmstrip at a reduced velocity in the film advance direction until the beam is again blocked by the filmstrip, then moves the filmstrip at a reduced velocity in the reverse direction until the beam passes through trailing edge of said film perforation, and lastly stops the filmstrip.

6. A film drive control system as defined in claim 5, further including:

a film drive motor that is adapted to operate in an advance direction and in a reverse direction.

7. A film drive control system as defined in claim 6, wherein the controller reduces the film velocity by decreasing the duty cycle of the motor.

8. A film drive control system as defined in claim 5, wherein the emitter comprises a light source that produces a beam of light having a wavelength in the non-visible light range.

9. A film drive control system as defined in claim 5, wherein the sensor comprises an optical photoreceptor that produces an electrical signal depending on whether or not the photoreceptor receives the beam from the light source.

10. In a camera having an exposure gate at which frames of exposures are produced on a photographic filmstrip that includes at least one frame-defining perforation having a leading edge and a trailing edge located along an edge of the filmstrip and having a drive apparatus that automatically advances the photographic filmstrip by one frame after each exposure frame is produced, a drive control system comprising:

an emitter positioned at a predetermined location relative to the exposure gate to emit a beam directed at a first side of the filmstrip;

a sensor positioned at the filmstrip side opposite the emitter such that it receives the beam from the emitter when the beam passes through a film perforation and otherwise is blocked from receiving the beam by the filmstrip;

a film drive motor adapted to move the filmstrip in a film advance direction and in a film reverse direction; and a controller adapted to control the operation of the motor after an exposure is produced to move the filmstrip in a film advance direction at a relatively high velocity until the beam from the emitter passes through the leading edge of a film perforation and is received by the sensor, to move the filmstrip in the film advance direction at a reduced velocity from the time the emitter beam is received by the sensor until the emitter beam is blocked by the filmstrip and no longer is received by the sensor, then to move the filmstrip in the film reverse direction at a reduced velocity from the time the beam is blocked until the beam again passes through trailing edge of the film perforation and is received by the sensor, and then to stop the filmstrip.

11. A camera adapted to receive a photographic filmstrip and produce a series of spaced-apart exposure frames on the filmstrip, the filmstrip having said at least one perforations, each having a leading edge and a trailing edge that define exposure frame intervals, the camera comprising:

an exposure gate at which the exposure frames are produced;

an emitter that produces a beam of light and is positioned at a predetermined location relative to the exposure gate;

a sensor that is positioned substantially adjacent one surface of the filmstrip such that the sensor receives the beam from the emitter when the beam passes through a film perforation and otherwise is blocked from receiving the beam by the filmstrip;

a film drive motor that is adapted to move the filmstrip in a film advance direction and in a film rewind direction; and a controller that controls the duty cycle of the motor such that after an exposure is produced the motor is operated at a 100% duty cycle so it moves the filmstrip in a film advance direction until the beam from the emitter passes through the leading edge of a film perforation and is received by the optical sensor, when the motor is operated at a reduced duty cycle so it moves the filmstrip in the film advance direction until the beam is blocked by the filmstrip and no longer is received by the sensor, such that the motor is operated at a reduced duty cycle in an opposite direction so it moves the filmstrip in the film reverse direction until the beam again passes through the trailing edge of the film perforation and is received by the sensor, whereupon the controller stops the film drive motor.

* * * * *